United States Patent
Matsubara

(10) Patent No.: US 9,377,675 B2
(45) Date of Patent: Jun. 28, 2016

(54) LIGHT SOURCE DEVICE AND PROJECTOR

(71) Applicant: SEIKO EPSON CORPORATION, Tokyo (JP)

(72) Inventor: Takayuki Matsubara, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 373 days.

(21) Appl. No.: 14/074,240

(22) Filed: Nov. 7, 2013

(65) Prior Publication Data

US 2014/0139810 A1  May 22, 2014

(30) Foreign Application Priority Data

Nov. 20, 2012  (JP) ................. 2012-253927

(51) Int. Cl.
  *G03B 21/14* (2006.01)
  *G02B 19/00* (2006.01)
  *G03B 21/20* (2006.01)
  *G02B 27/10* (2006.01)

(52) U.S. Cl.
  CPC ........ *G03B 21/2013* (2013.01); *G02B 19/0057* (2013.01); *G02B 27/102* (2013.01); *G03B 21/204* (2013.01); *G03B 21/208* (2013.01)

(58) Field of Classification Search
  CPC .......... G03B 21/2073; G03B 21/2033; G03B 21/2066; H04N 9/3129; H04N 9/3158; H04N 9/3161; H04N 9/3164; H04N 9/3167; G02B 19/0057; G02B 27/102
  USPC ........... 353/38, 102; 362/227, 234, 235, 237, 362/249.02, 249.06, 249.14
  See application file for complete search history.

(56) References Cited

U.S. PATENT DOCUMENTS

| | | | | |
|---|---|---|---|---|
| 6,286,961 B1* | 9/2001 | Ogawa | ............... | G02B 27/0905 348/E5.137 |
| 6,406,149 B2* | 6/2002 | Okuyama | ............ | G02B 27/283 348/E5.137 |
| 7,382,534 B2* | 6/2008 | Shinbo | ................. | H04N 9/3141 348/E5.141 |
| 7,733,574 B2* | 6/2010 | Mizusawa | ........... | G03F 7/70075 359/385 |
| 8,167,440 B2 | 5/2012 | Sato et al. | | |
| 8,624,799 B2* | 1/2014 | Miura | .................. | G02B 3/0056 345/32 |
| 8,810,740 B2* | 8/2014 | Taketsu | ............... | G02B 19/0057 349/8 |
| 2012/0051044 A1* | 3/2012 | Akiyama | ........... | G03B 21/2013 362/233 |
| 2012/0133904 A1* | 5/2012 | Akiyama | ............. | G02B 27/102 353/38 |
| 2013/0100420 A1* | 4/2013 | Ferri | .................... | G03B 21/204 353/31 |
| 2014/0104317 A1* | 4/2014 | Tsai | ........................ | G03B 21/14 345/634 |

FOREIGN PATENT DOCUMENTS

| | | |
|---|---|---|
| JP | A-2011-013317 | 1/2011 |
| JP | B2-4815445 | 11/2011 |
| JP | A-2012-013977 | 1/2012 |
| WO | WO 2006/080534 A2 | 8/2006 |

* cited by examiner

*Primary Examiner* — William C Dowling
(74) *Attorney, Agent, or Firm* — Oliff PLC

(57) ABSTRACT

A light source section is provided with a plurality of light sources. A pitch of the light sources in a first direction and a pitch in a second direction are regulated in accordance with a specific cross-sectional shape of a light beam.

24 Claims, 12 Drawing Sheets

LIGHT SOURCE DEVICE AND PROJECTOR

BACKGROUND

1. Technical Field

The present invention is related to a light source device having a plurality of light sources, and a projector using the light source device.

2. Related Art

In a light source device for generating fluorescence by irradiating a fluorescent layer with excitation light from a solid-state light source group, and a projector using this light source device, there has been known those having a mirror group for narrowing the distance between the lights from the respective solid-state light sources (JP-A-2011-13317).

In the light source device and so on described in this document, the number of components increases. Further, since the mirror group is disposed obliquely with respect to an optical axis of the light from the solid-state light source, the device grows in size. Further, since the alignment between the solid-state light source group and the mirror group is difficult, the cost increases.

SUMMARY

An advantage of some aspects of the invention is to provide a light source device capable of using light with high efficiency while avoiding the increase in manufacturing cost and the growth in device size, and a projector capable of forming a high-luminance image while suppressing the increase in cost and the growth in size by using the light source device.

A light source device according to an aspect of the invention includes a light source section having a plurality of light sources, each of the light sources emits a radial light beam, a divergence of the radial light beam in a first direction is greater than a divergence of the radial light beam in a second direction perpendicular to the first direction, the light sources are arranged so as to form a plurality of light source columns parallel to each other and extending in the first direction, and when denoting a pitch of the light sources in the first direction by P1, and a pitch of the light source columns by P2, P1 is larger than P2.

According to the light source device described above, by setting the distance between the light sources and the distance between the light source columns in accordance with the cross-sectional shape of the light beam from the light source, the density of the light sources can easily be increased. In other words, a larger number of light sources than in the background art device can be arranged in a predetermined area. Therefore, the light efficiency can be increased without increasing the number of components, and thus, the relatively high-intensity source light can be obtained despite the small size. Therefore, by using the light source device according to this aspect of the invention for, for example, a projector, a high-luminance image can be formed while suppressing increase in the number of components and growth in size.

According to a specific aspect of the invention, when denoting a divergence angle of the radial light beam in the first direction by $\theta_\perp$, and a divergence angle of the radial light beam in the second direction by $\theta_\|$, the following formula:

$$\tan \theta_\| / \tan \theta_\perp \leq P2/P1 < 1.0$$

is fulfilled. By setting the ratio between the pitch P1 of the plurality of light sources and the pitch P2 of the light source columns as described above, the light can be used with high efficiency while avoiding increase in cost and growth in size of the device.

According to another aspect of the invention, the radial light beam has an intensity distribution according to a Gaussian distribution, and the divergence angles are each an angle at which the intensity of the radial light beam is equal to a value obtained by multiplying $1/e^2$ by an intensity on an optical axis of the radial light beam. In this case, the light beam within the range in which the intensity is sufficient for the illumination light can exhaustively be used.

According to still another aspect of the invention, a collimating lens array including a plurality of lens elements disposed so as to correspond to the plurality of light sources is further included. In this case, the light generated by each of the light sources can be collimated by corresponding one of the lens elements constituting the collimating lens array.

According to yet another aspect of the invention, a first lens element of the plurality of lens elements corresponds to a first light source of the plurality of light sources, and when denoting a distance between the first light source and the first lens element by D, an effective lens width of the first lens element in the first direction by H1, an effective lens width of the first lens element in the second direction by H2, a divergence angle of the radial light beam in the first direction by $\theta_\perp$, and a divergence angle of the radial light beam in the second direction by $\theta_\|$, the following relation:

$\tan \theta_\perp \leq H1/(2 \times D)$ and $\tan \theta_\| \leq H2/(2 \times D)$ is fulfilled. According to this aspect of the invention, the size of each of the lens elements is sufficient for taking in the light beam emitted from the corresponding one of the light sources.

According to still yet another aspect of the invention, in the collimating lens array, some of the lens elements constituting a contour portion of the collimating lens array are arranged in accordance with a contour of an irradiation target in a posterior stage, to which the light emitted from the light source section is input. In this case, since the contour of the collimating lens array corresponds to the contour of the irradiation target in the posterior stage, the light efficiency can be improved while achieving the miniaturization of the light source device.

According to further another aspect of the invention, each of the light sources is a solid-state light source. In this case, stable and intensive light can be emitted by a relatively small device.

According to still further another aspect of the invention, the solid-state light source is a laser source. In this case, the light with high energy density can be used as the source light.

According to yet further another aspect of the invention, an afocal optical system adapted to regulate a cross-section of a light beam emitted from the light source section, a lens array integrator disposed in a posterior stage of the afocal optical system, and adapted to divide light input to the lens array integrator, and emit the light so as to overlap at a predetermined position, and an object disposed at the predetermined position are further included. In this case, the object for generating the source light can evenly be irradiated.

According to still yet further another aspect of the invention, the object is one of a diffusion plate adapted to diffuse the light and a phosphor layer adapted to generate a fluorescence. In this case, the light in the moderately diffused state or the light in the suitable wavelength band can be generated as necessary.

According to a further aspect of the invention, a rotary plate adapted to rotatably hold the object is further included. In this case, it is possible to prevent a specific area of the object from being continuously irradiated with intensive light. Thus, the deterioration of the object due to heat can be suppressed. In the case in which the object is a phosphor layer, bright illumination becomes possible avoiding the degradation of the emission efficiency caused when increasing the output of the excitation light source device.

A projector according to an aspect of the invention includes the light source device according to any one of the aspects of the invention described above, a light modulation device adapted to modulate the light from the light source device in accordance with image information, and a projection optical system adapted to project the modulated light from the light modulation device as a projection image. In this case, by using the light source device described above, a high-luminance image can be formed while suppressing increase in the number of components and growth in size.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a first embodiment of the invention will be explained in detail with reference to the accompanying drawings.

Figure 1:
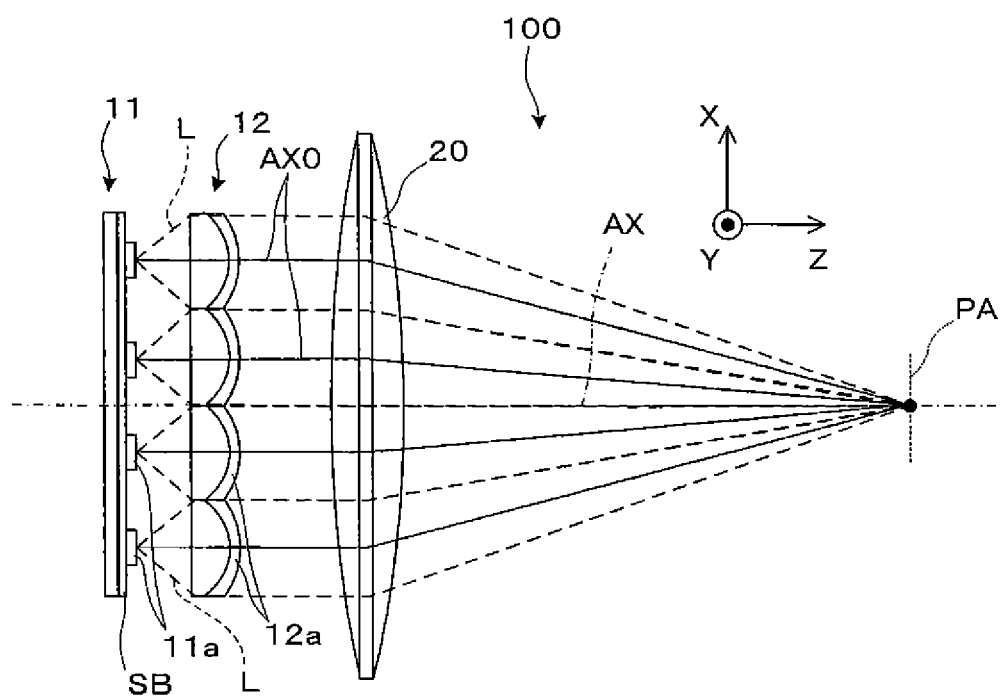
FIG. 1 is a diagram for explaining the optical system of a light source device according to a first embodiment of the invention.

A light source device 100 shown in FIG. 1 is provided with a light source section 11 having light sources for excitation, a collimating lens array 12 for collimating the light from the light source section 11, and a collecting lens 20 as a light collection optical system.

The light source section 11 is provided with a plurality of light sources 11a arranged in a matrix on a substrate SB. The light sources 11a are each a laser source for emitting a blue laser beam L along an optical axis AX of the light source device 100. The laser beam L is emitted from each of the light sources 11a as a radial light beam. The laser beam L is a linearly polarized light, and has a light emission intensity peak wavelength at, for example, about 445 nm, and a wavelength band of 430 through 450 nm as a principal component.

The collimating lens array 12 is formed of a plurality of lens elements 12a corresponding respectively to the light sources 11a constituting the light source section 11, and roughly collimating the lights from the respective light sources 11a, and then emits the lights toward the collecting lens 20. Each of the lens elements 12a has a rectangular shape viewed from a direction parallel to the optical axis AX, and further, the lens elements 12a are tightly arranged in a matrix (see FIGS. 2A and 2B).

Figure 3A:
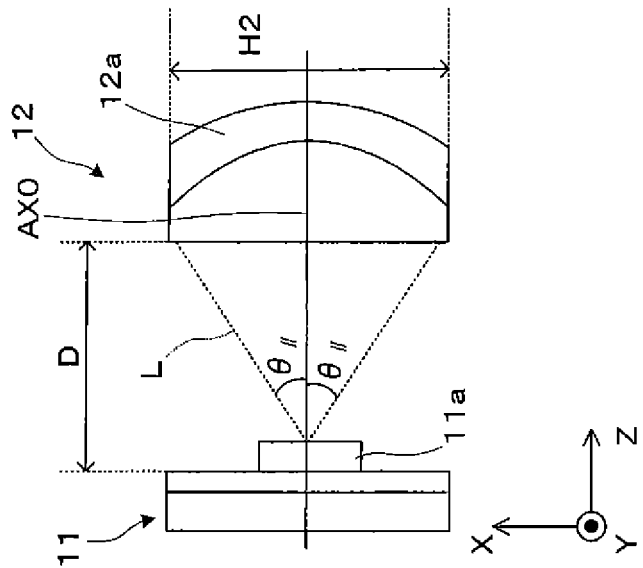
FIG. 3A is a diagram showing a cross-section of one of the light sources and one of lens elements corresponding to the light source.
Figure 3B:
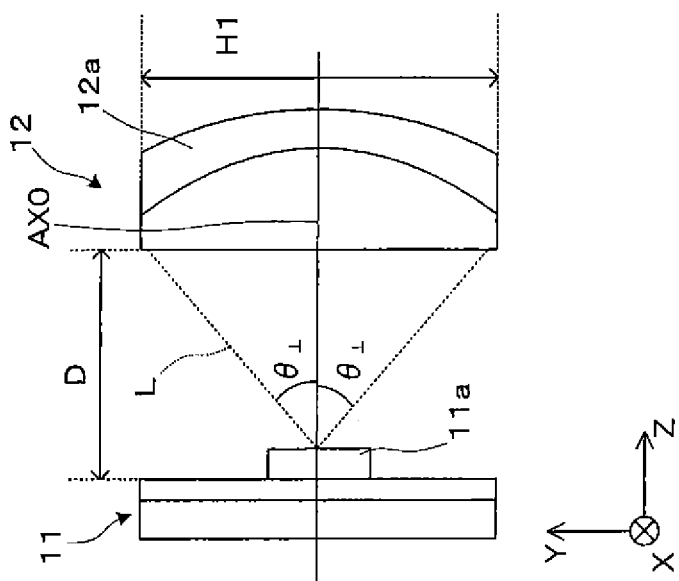
FIG. 3B is a diagram showing another cross-section thereof.

It should be noted that the divergence of the light beam of the laser beam L emitted from each of the light sources 11a has an anisotropic property. In the present specification, as shown in FIGS. 3A and 3B, it is defined that the optical axis direction AX0 of one of the light sources 11a is a Z-axis direction, the direction in which the divergence of the light beam is the maximum is a Y-axis direction, and a direction perpendicular to both of the Y-axis direction and the Z-axis direction is an X-axis direction. In the case of defining the coordinate axes in such a manner as described above, the cross-sectional shape of the light beam of the laser beam L along a plane perpendicular to the optical axis direction AX0 is an elliptical shape having a long axis in the Y-axis direction. Here, in the cross-section of the light beam of the laser beam L, the shape of the area where the light intensity is equal to or higher than $1/e^2$ of the intensity on the optical axis is defined as the cross-sectional shape of the light beam.

Each of the lens elements 12a corresponding respectively to the light sources 11a has a shape corresponding to the cross-sectional shape of the light beam of the laser beam L.

The collecting lens 20 emits the laser beams L, having been emitted from the collimating lens array 12, as source light of the light source device 100 toward an irradiation target position PA in a roughly converged state. In the case of, for example, disposing a phosphor layer (not shown) at the irradiation target position PA, the phosphor layer excited by the laser beam L generates fluorescence of a desired color. Therefore, the light source device 100 provided with the phosphor layer becomes applicable to a light source device for a projector or the like.

Hereinafter, the arrangement of the plurality of light sources 11a and the plurality of lens elements 12a out of the light source device 100 will be explained in detail with reference to FIG. 2A and so on.

Figures 2A, 2B:
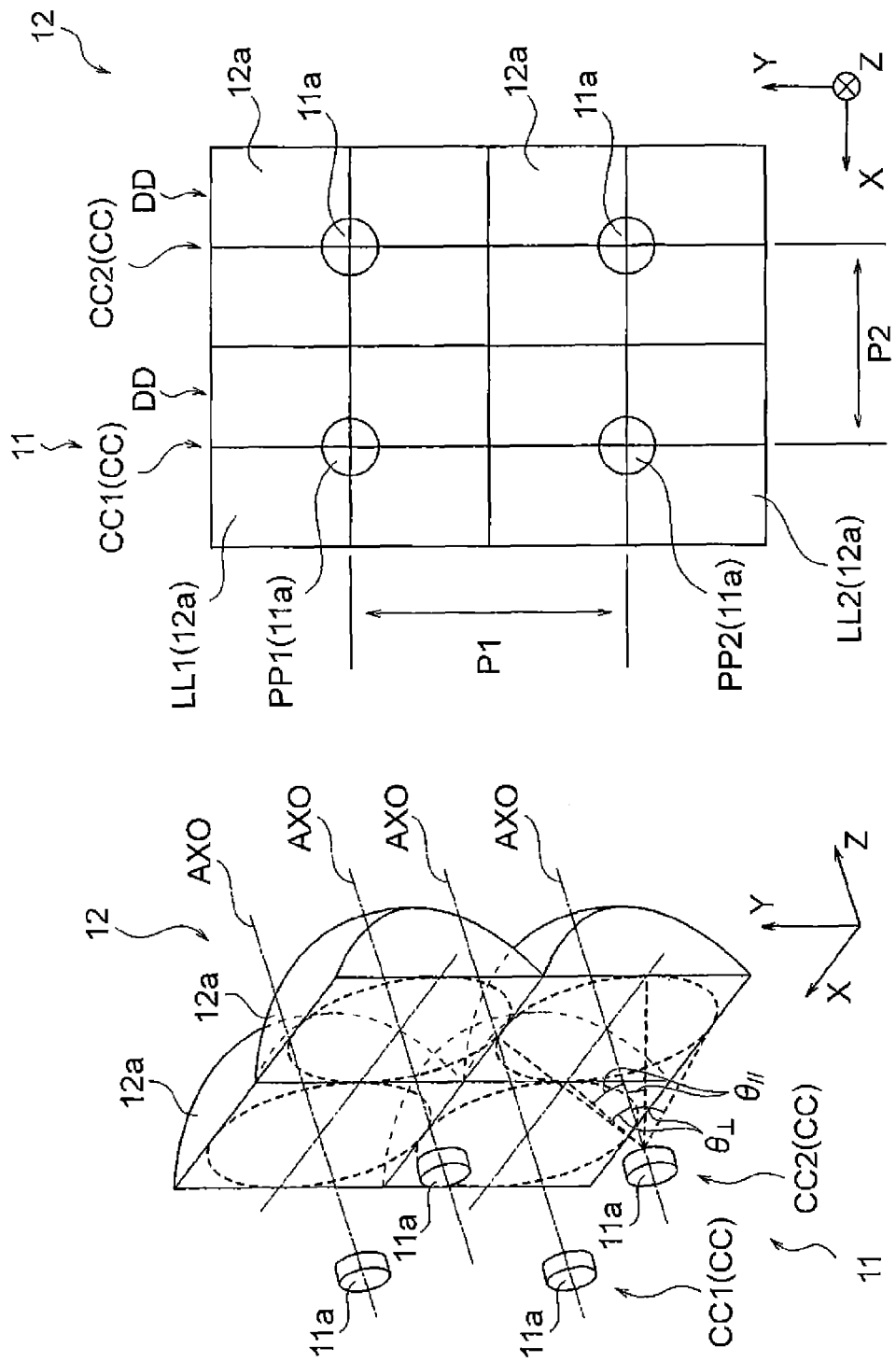
FIG. 2A is a perspective view schematically showing a part of an arrangement of light sources in a light source section.
FIG. 2B is a diagram for explaining an aspect ratio of the light sources thus arranged.

As shown in FIGS. 2A and 2B, the plurality of light sources 11a constituting the light source section 11 forms a plurality of light source columns CC parallel to each other. Further, the plurality of light sources 11a is arranged in a matrix. As shown in the drawings, the light source columns CC each extend in the Y direction, and are arranged in the X direction. Therefore, it is hereinafter defined that the Y direction is a first direction, and the X direction is a second direction.

Here, as shown in FIGS. 2A, 3A, and 3B, in the light source section 11, the divergence of the light beam of the laser beam L, which is emitted from each of the light sources 11a, in the first direction (the Y direction) is greater than the divergence of the light beam in the second direction (the X direction). Specifically, assuming that a divergence angle of the light beam in the Y-Z cross-section parallel to the first direction and including the optical axis AX0 of the light source 11a is denoted with $\theta_\perp$, and a divergence angle of the light beam in the X-Z cross-section parallel to the second direction and including the optical axis AX0 of the light source 11a is denoted with $\theta_\parallel$, the divergence angle $\theta_\perp$ is larger than the divergence angle $\theta_\parallel$ (see FIGS. 3A and 3B). In the present embodiment, since the plurality of light sources 11a is arranged so as to correspond to the cross-sectional shape of the light beam specific to the light sources 11a described above, it is possible to arrange a larger number of light sources 11a in a predetermined area compared to the background art device. In other words, the light sources 11a can be arranged more densely compared to the background art device. Thus, the highly efficient use of the light becomes possible. It should be noted that the optical axis AX0 of each of the light sources 11a is parallel to the optical axis AX of the light source device 100.

Hereinafter, the arrangement of the plurality of light sources 11a will more specifically be explained with reference to FIGS. 2A and 2B.

Firstly, as shown in the drawings, the distance between two light sources 11a adjacent to each other in one light source column CC such as the light source PP1 and the light source PP2 out of the plurality of light sources 11a arranged at regular intervals in the first direction (the Y direction) is defined as P1. The distance P1 denotes the pitch of the light sources in the first direction (the Y direction).

Further, the distance between the light source columns adjacent to each other such as a first light source column CC1 and a second light source column CC2 out of the plurality of light source columns CC arranged in the second direction (the X direction) at regular intervals is defined as P2. In the intervals between the light source columns CC, the distance P2 denotes the pitch of the light sources in the second direction (the X direction).

In the present embodiment, the distance P1 is set to be larger than the distance P2. As described above, since the distance P1 and the distance P2 are set taking the cross-sectional shape of the light beam into consideration, the light source density can easily be increased. In other words, a larger number of light sources than in the background art device can be arranged in a predetermined area. Therefore, a relatively high-intensity source light can be obtained despite the small size.

FIGS. 3A and 3B are diagrams each showing one (a first light source) of the light sources 11a and corresponding one (a first lens element) of the lens elements 12a of the collimating lens array 12. FIG. 3A shows the divergence angle $\theta_\perp$ of the light beam of the laser beam L from the light source 11a in the Y-Z cross-section, and FIG. 3B shows the divergence angle $\theta_\parallel$ of the light beam of the laser beam L from the light source 11a in the X-Z plane. Here, as already described, the divergence angle $\theta_\perp$ is larger than the divergence angle $\theta_\parallel$. In accordance therewith, the lens element 12a has a sufficiently large lens width. Specifically, as shown in the drawings, assuming that a distance from the light source 11a to the lens element 12a in the optical axis direction (the Z direction) is D, an effective lens width of the lens element 12a in the first direction (the Y direction) is H1, and an effective lens width of the lens element 12a in the second direction (the X direction) is H2, both of the following conditions:

$$\tan \theta_\perp \leq H1/(2 \times D) \quad (a)$$

$$\tan \theta_\parallel \leq H2/(2 \times D) \quad (b)$$

are fulfilled in the present embodiment. Since Formula (a) above is fulfilled, the size of the lens element 12a in the first direction (the Y direction) is sufficient for taking in the laser beam L with the divergence angle $\theta_\perp$ in the first direction (the Y direction). Similarly, since Formula (b) above is fulfilled, the size of the lens element 12a in the second direction (the X direction) is sufficient for taking in the laser beam L with the divergence angle $\theta_\parallel$ in the second direction (the X direction). In other words, the whole of the laser beam L from the one light source 11a can enter the one lens element 12a. Thus, the lens element 12a can efficiently take in the laser beam L from the light source 11a.

Figure 4:
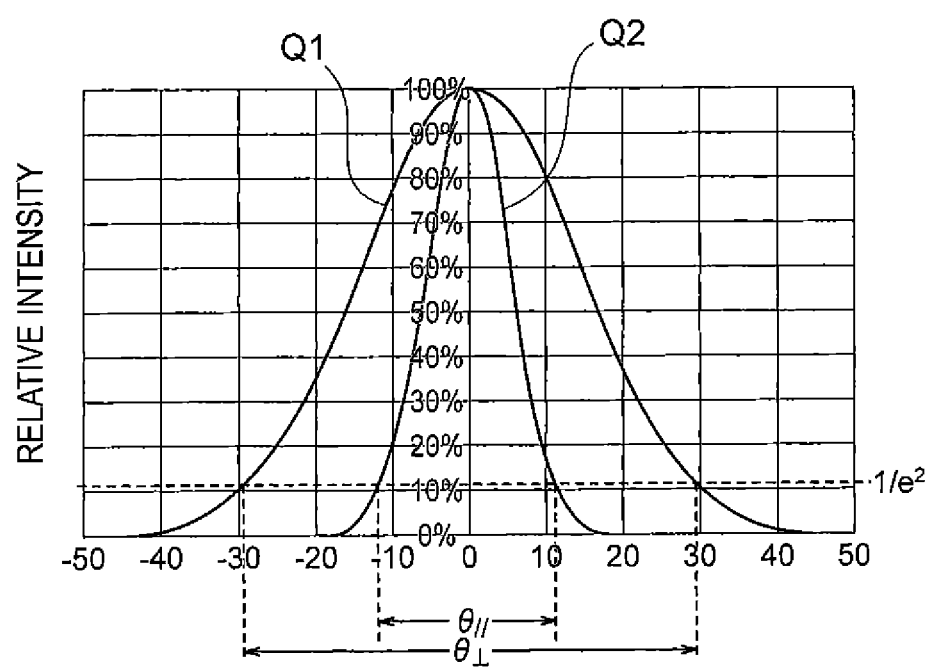
FIG. 4 is a graph showing an example of a light intensity distribution in both of a vertical direction (a first direction) and a horizontal direction (a second direction).

Hereinafter the relationship between the divergence of the light beam, the arrangement of the light sources 11a, and the arrangement of the lens elements 12a will be explained in more detail. FIG. 4 is a graph showing an angular distribution of the light intensity of the radial light beam from the light source 11a in the cross-section perpendicular to the optical axis AX0. The horizontal axis represents the angle with respect to the optical axis AX0, and the vertical axis represents a relative intensity. The curve Q1 denotes the angular distribution of the light intensity in the Y-Z, cross-section. On the other hand, the curve Q2 denotes the angular distribution of the light intensity in the X-Z cross-section. In other wards, the curve Q1 is a distribution defining the divergence angle $\theta_\perp$, and the curve Q2 is a distribution defining the divergence angle $\theta_\parallel$. Here, as indicated by the curve Q1 and the curve Q2, the light source 11a emits the light with the intensity distribution according to a Gaussian distribution. In the present embodiment, as shown in the drawings, the angles of the light at which the light intensity is equal to value obtained by multiplying $1/e^2$ by the intensity on the optical axis are defined as the divergence angles $\theta_\perp$, $\theta_\parallel$ in the curves Q1, Q2, respectively. Here, the light intensity at the radiation angle of 0 degree corresponds to the intensity on the optical axis.

In the present embodiment, the distance P1, the distance P2, the divergence angle $\theta_\parallel$, and the divergence angle $\theta_\perp$ fulfill Formula (1):

$$\tan \theta_\parallel / \tan \theta_\perp \leq P2/P1 < 1.0 \quad (1).$$

In this case, in accordance with the cross-sectional shape of the light beam, in which the divergence angle $\theta_\perp$ is larger than the divergence angle $\theta_\parallel$ as shown in FIG. 4 as an example, the distance P1 is longer than the distance P2. Therefore, the lens element 12a can efficiently take in the laser beam L from the light source 11a. Furthermore, the laser beam L from the light source 11a can efficiently be used. It should be noted that as shown in FIG. 2B and so on, in the case in which the plurality of light sources 11a and the plurality of lens elements 12a are arranged so as to correspond to each other at the same pitch as each other, P1=H1 and P2=H2 are true, and by substituting these conditions to Formulas (a) and (b), the following formulas:

$$\tan \theta_\perp \leq H1/(2 \times D) \quad (a1)$$

$$\tan \theta_\parallel \leq H2/(2 \times D) \quad (b1)$$

are obtained. By fulfilling Formula (a1) and (b1) described above, each of the lens elements 12a can efficiently take in the laser beam L from the corresponding light source 11a.

Figure 5:
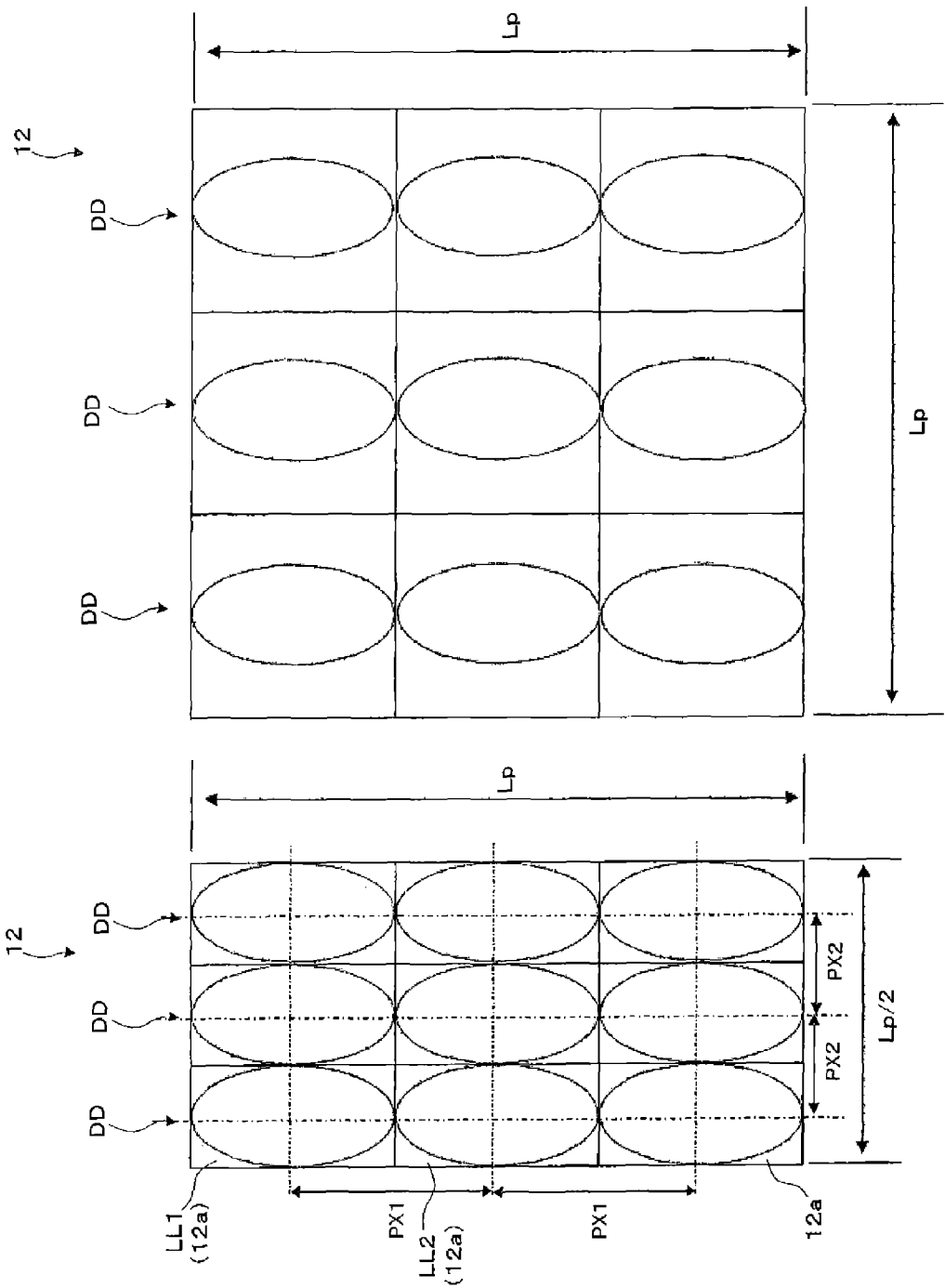
FIG. 5A is a diagram showing an example of an arrangement of a lens array of the embodiment of the invention.
FIG. 5B is a diagram showing an arrangement in a comparative example.

Hereinafter, FIG. 5A shows an example of a specific arrangement of the lens elements 12a of the collimating lens array 12. It should be noted that FIG. 5B is a diagram showing a comparative example. Here, as shown in the drawings, one of the lens element columns DD is composed of a plurality of lens elements 12a. In one lens element column DD, the pitch of two lens elements adjacent to each other such as the lens element LL1 and the lens element LL2 out of the plurality of lens elements 12a is denoted by a distance PX1, and the pitch of the plurality of lens element columns DD is denoted by a distance PX2. Here, PX1=H1 and PX2=H2 are true. In the case in which the plurality of light sources 11a and the plurality of lens elements 12a are arranged at the same pitch as each other, the distance P1 is equal to the distance PX1, and the distance P2 is equal to the distance PX2. Therefore, hereinafter, it is assumed that P1=PX1 and P2=PX2 are true.

In an example shown in FIG. 5A, the nine lens elements 12a are arranged in a 3×3 matrix with respect to both of the first direction (a vertical direction) and the second direction (a horizontal direction). It is assumed that $\tan\theta_\parallel:\tan\theta_\perp$ is equal to 1:2, and the aspect ratio of each of the lens elements 12a is adjusted to 1:2 in accordance therewith. Specifically, in accordance with the fact that the divergence (the cross-sectional shape) of the light beam is vertically long in the first direction at a ratio of 1:2, the entire length, namely the length corresponding to three pitches, in the second direction is Lp/2 while the entire length, namely the length corresponding to three pitches, in the first direction is Lp. In this case, the ratio between the distance PX1 and the distance PX2 is equal to $\tan\theta_\parallel/\tan\theta_\perp = P2/P1 = PX2/PX1 = (Lp/2)/Lp = 1/2$, which fulfills the requirement of Formula (1) described above.

In contrast, in the case setting the aspect ratio of the lens element 12a to 1:1, and setting both of the vertical and horizontal lengths to Lp in accordance with the divergence (the cross-sectional shape) of the light beam in the vertical direction despite $\tan\theta_\parallel:\tan\theta_\perp$ is equal to 1:2 as in the comparative example shown in FIG. 5B, some portion of the lens element 12a fails to be efficiently used, and further, the device grows in size. On the other hand, in the case of decreasing the size of the lens element 12a while keeping the aspect ratio at 1:1, the proportion of the light beam, which fails to be effectively used, increases. In the example shown in FIG. 5A, by adjusting the pitch of the plurality of light sources 11a and the pitch of the plurality of lens elements 12a in accordance with the cross-sectional shape of the light beam specific to the light sources 11a, the highly efficient use of the light is made possible in a close-packed manner.

Figure 6:
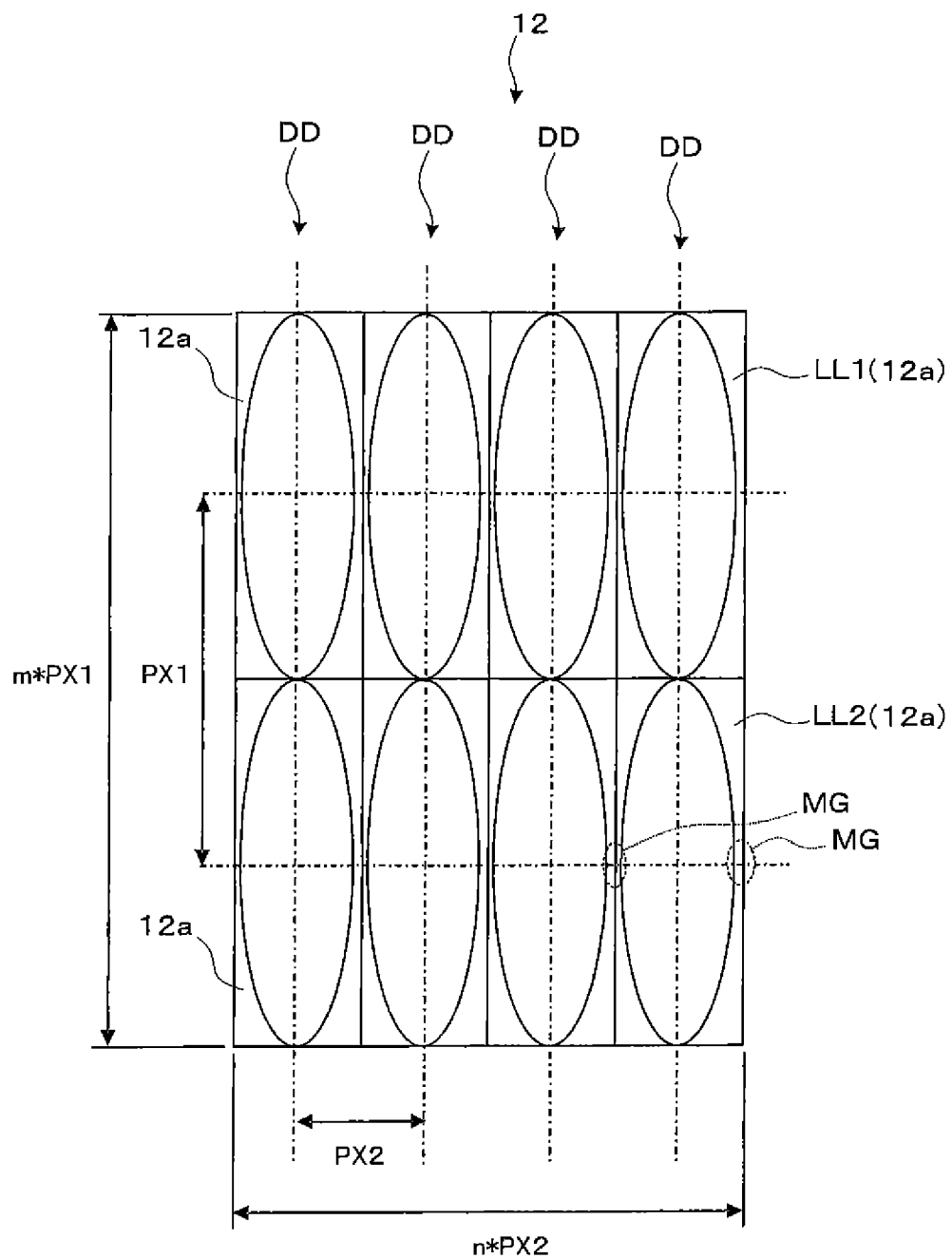
FIG. 6 is a diagram showing another example of the arrangement of the lens array in the embodiment.

FIG. 6 is a diagram showing another example of a specific arrangement of the lens elements 12a of the collimating lens array 12. The case shown in FIG. 5A and so on gives priority to making the light beam from one light source 11a be taken by the corresponding lens element 12a with high efficiency. In contrast thereto, the example shown in FIG. 6 gives priority to miniaturizing the optical system in the posterior stage such as the collecting lens 20 by optimizing the aspect ratio of the collimating lens array 12. In other words, the example is different from the example shown in FIG. 5A in the point that priority is given to the shape of the collimating lens array 12, and the shape of the lens elements 12a and the arrangement thereof are determined in accordance with therewith.

Here, in FIG. 6, the reference symbols used for the width and the pitch of the lens elements 12a are the same as those used in FIG. 5A, and therefore, the explanation will be omitted. In FIG. 6, the number of the lens element columns DD arranged in the second direction is denoted by n, and the number of lens elements in each of the lens element columns DD is denoted by m. Both of the symbols m and n respectively denote arbitrary positive integers. Here, the aspect ratio of the collimating lens array 12 is appropriately set in a range in which Formula (2):

$$\tan\theta_\parallel/\tan\theta_\perp \leq (m \times PX2)/(n \times PX1) \leq \tan\theta_\perp/\tan\theta_\parallel \quad (2)$$

is fulfilled so that the optical system in the posterior stage such as the collecting lens 20 can be miniaturized. Thus, the contour shape of the light from the light source section 11 can arbitrarily be adjusted, and therefore, the optical system in the posterior stage can be miniaturized while taking in the light with high efficiency. It should be noted that in the case of FIG. 6, the ratio between the divergence angle $\theta_\perp$ and the divergence angle $\theta_\parallel$ do not necessarily coincide accurately with the aspect ratio of the lens element 12a. However, even in such a case, by, for example, providing a minute margin MG to the lens element 12a, it is possible to suppress the degradation of the light use efficiency in each of the lens elements 12a while keeping the state of accurately taking in the light.

In the present embodiment, the distance P1, the distance P2, the distance PX1, and the distance PX2 are set in accordance with the cross-sectional shape of the light beam specific to the light source 11a. Thus, the light source device 100 is made to be capable of increasing the light use efficiency without increasing the number of components to thereby generate the source light relatively high in intensity despite the small size.

Further, it is also possible to adjust the arrangement of the light sources 11a constituting the contour portion out of the plurality of light sources 11a and the arrangement of the lens elements 12a constituting the contour portion out of the plurality of lens elements 12a as shown in FIGS. 7A through 7D.

Figure 7A:
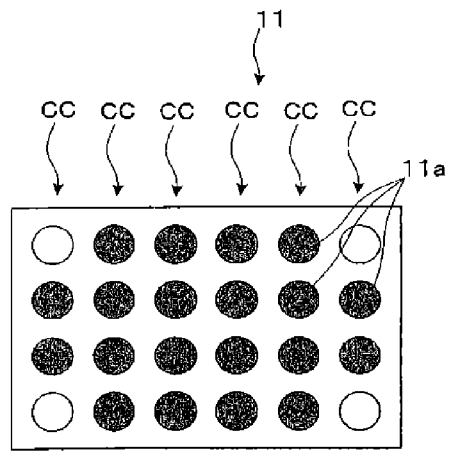
FIG. 7A is a diagram for explaining a modified example of the arrangement of the light sources of the light source device.

FIG. 7A shows an example of the light source section 11 having the 20 light sources 11a. The arrangement of the lens elements 12a corresponding respectively to the light sources 11a is substantially the same. Further, FIG. 7B is a cross-sectional view perpendicular to the optical axis AX of the light beam in the arrangement of the light sources 11a shown in FIG. 7A. Here, as shown in FIG. 7A, the light source section 11 has totally 20 light sources 11a arranged therein by arranging the light sources 11a in a 6×4 matrix, in which the four light sources 11a can be arranged in each of the six light source columns CC, except the four corners. In other words, the four columns in the central portion of the six light source columns CC are each composed of the four light sources 11a, the two columns on both sides are each composed of the two light sources 11a with the upper end and the lower end removed compared to other columns. In this case, as shown in FIG. 7B, the overall cross-sectional shape of the light beams becomes an approximately circular shape. Therefore, a circular region DM1 encompassing all of the cross-sections of the light beams can be made smaller. Here, the circular region DM1 corresponds to the size of the collecting lens (see FIG. 1) disposed in the posterior stage of the collimating lens array 12. Therefore, it means that the smaller the diameter D1 of the region DM1 is, the smaller the collecting lens 20 can be made, and therefore, the smaller the overall size of the light source device 100 can be made.

Figure 7C:
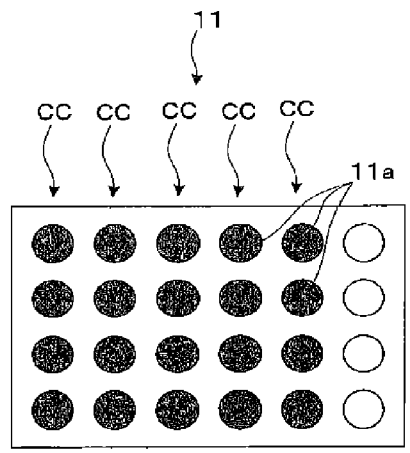
FIG. 7C is a diagram for explaining an arrangement example of the light sources of the light source device of the comparative example.
Figure 7B:
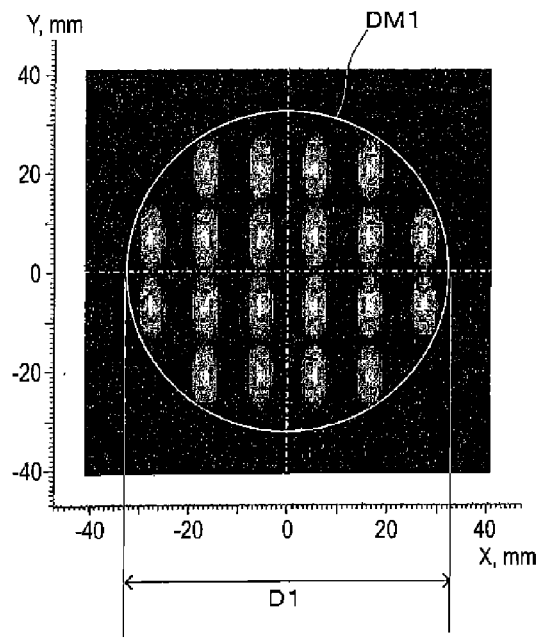
FIG. 7B is a diagram showing cross-sections of respective light beams in the arrangement shown in FIG. 7A.
Figure 7D:
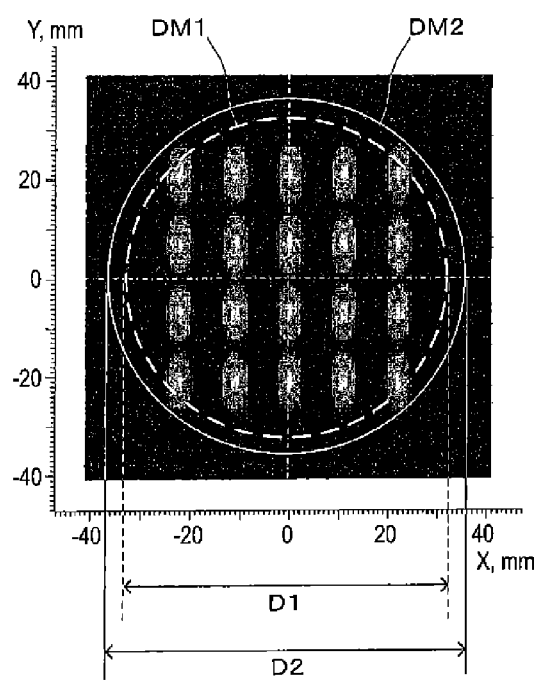
FIG. 7D is a diagram showing cross-sections of respective light beams in the arrangement shown in FIG. 7C.

In contrast, the comparative example shown in FIG. 7C has the same number, namely 20, of the light sources 11a, but is different in the arrangement of the plurality of light sources 11a from the example shown in FIG. 7A. Specifically, the light source section 11 is arranged to have five light source columns CC each composed of four light sources. FIG. 7D is a cross-sectional view perpendicular to the optical axis AX of the light beam in the arrangement of the light sources 11a shown in FIG. 7C. In this case, as shown in the drawings, it is understood that the circular region DM2 encompassing the overall light beam cross-sections is larger than the circular region DM1 in the example shown in FIG. 73, namely the diameter D2 is larger than the diameter D1. In other words, in the arrangement of the comparative example, the collecting lens 20 grows in size, and furthermore, the whole light source device 100 grows in size. In the present embodiment, by arranging the light sources 11a constituting the contour portion out of the plurality of light sources 11a and the lens elements 12a constituting the contour portion out of the plurality of lens elements 12a so as to correspond to the contour of the collecting lens 20 as the irradiation target in the posterior stage, the light emitted from the light source section 11 can be used with high efficiency while avoiding the growth in size of the device.

Second Embodiment

Hereinafter, a light source device according to a second embodiment will be explained. It should be noted that the light source device according to the present embodiment is a modified example of the light source device 100 according to the first embodiment, and is roughly the same as the light source device 100 except the structure in the posterior stage of the collimating lens array 12, and therefore, the explanation of the overall device will be omitted.

Figure 8:
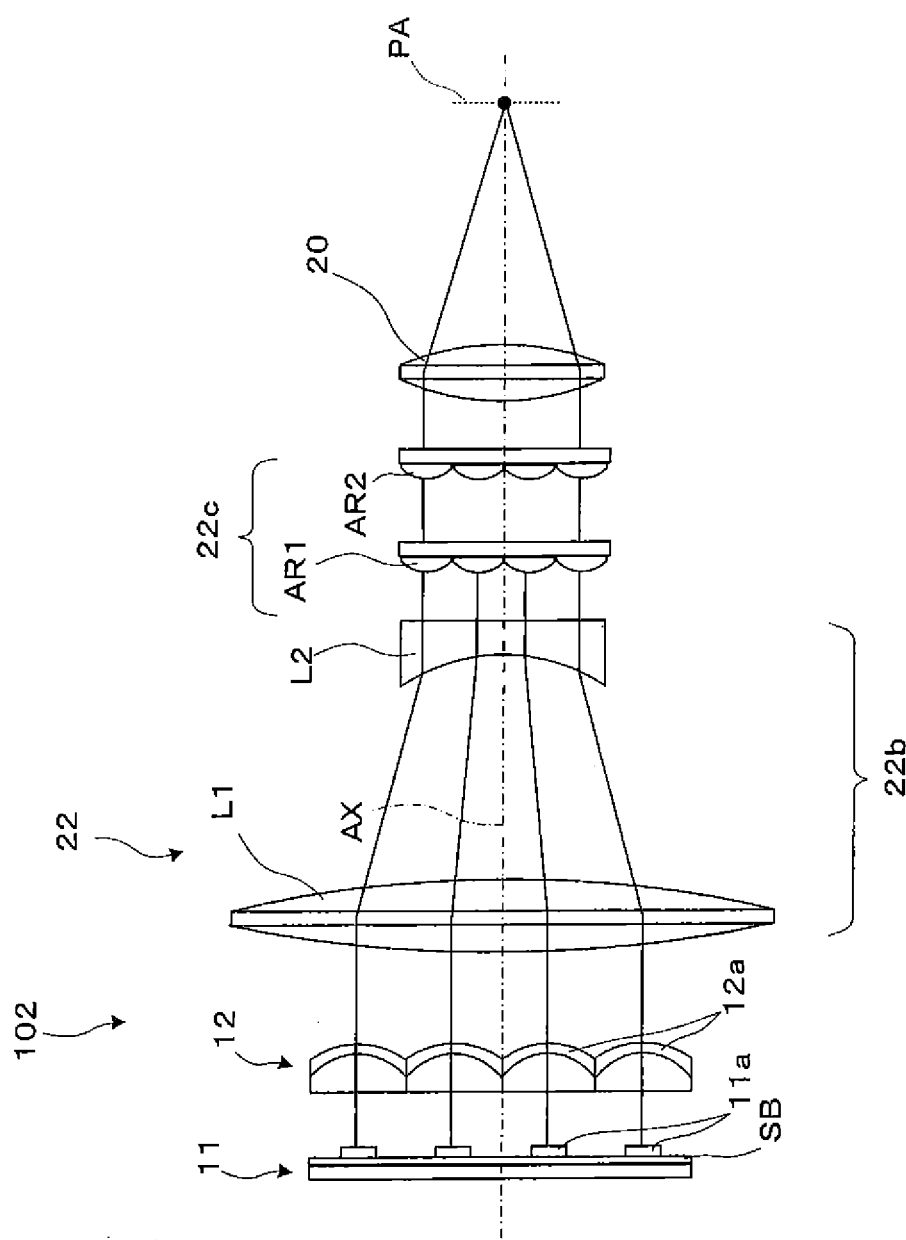
FIG. 8 is a diagram for explaining the optical system of a light source device according to a second embodiment of the invention.

As shown in FIG. 8, the light source device 102 according to the present embodiment is provided with the light source section 11, the collimating lens array 12, and a Kohler illumination system 22 for homogenizing the light of the collimating lens array 12. The Kohler illumination system 22 includes an afocal optical system 22b for regulating the cross-section of the light beam, a lens array integrator 22c for dividing the incident light, and the collecting lens 20 for overlapping the light, which has been emitted from the lens array integrator 22c, at an irradiation target position PA. In this point, the light source device 102 is different from the light source device 100 (see FIG. 1) for performing critical illumination.

The afocal optical system 22b out of the Kohler illumination system 22 is formed of a lens group having a positive lens L1 and a negative lens L2 combined with each other. The afocal optical system 22b regulates the size of the cross-section of the light beam while keeping the parallelism of the light input thereto in the collimated state. The light having the cross-section of the light beam regulated by the afocal optical system 22b enters the lens array integrator 22c. It should be noted that the cross-section of the light beam is regulated here to be reduced in size.

The lens array integrator 22c is formed of a pair of lens arrays AR1, AR2. The lens array integrator 22c divides the light input from the afocal optical system 22b into a plurality of partial light beams, and then makes the partial light beams enter the collecting lens 20. The collecting lens 20 emits the light, which has been input from the lens array integrator 22c, so as to overlap at the irradiation target position PA.

As described above, the laser beams L from the light source section 11 are roughly collimated by the collimating lens array 12, then further homogenized in the light intensity distribution by the Kohler illumination system 22, and then evenly illuminate the irradiation target position PA.

On this occasion, in the case of, for example, disposing a phosphor layer (not shown) at the irradiation target position PA, the phosphor layer excited by the laser beam L generates fluorescence of a desired color. Therefore, the light source device 102 provided with the phosphor layer becomes applicable to a light source device for a projector or the like. In this case, the intensity distribution of the fluorescence generated from the phosphor layer can also be homogenized.

Also in the present embodiment, the distance P1, the distance P2, the distance PX1, and the distance PX2 in the light source device 102 are set in accordance with the cross-sectional shape of the light beam specific to the light source 11a. Thus, the light source device 102 is made to be capable of increasing the light use efficiency without increasing the number of components to thereby generate the source light relatively high in intensity despite the small size.

Third Embodiment

Figure 9:
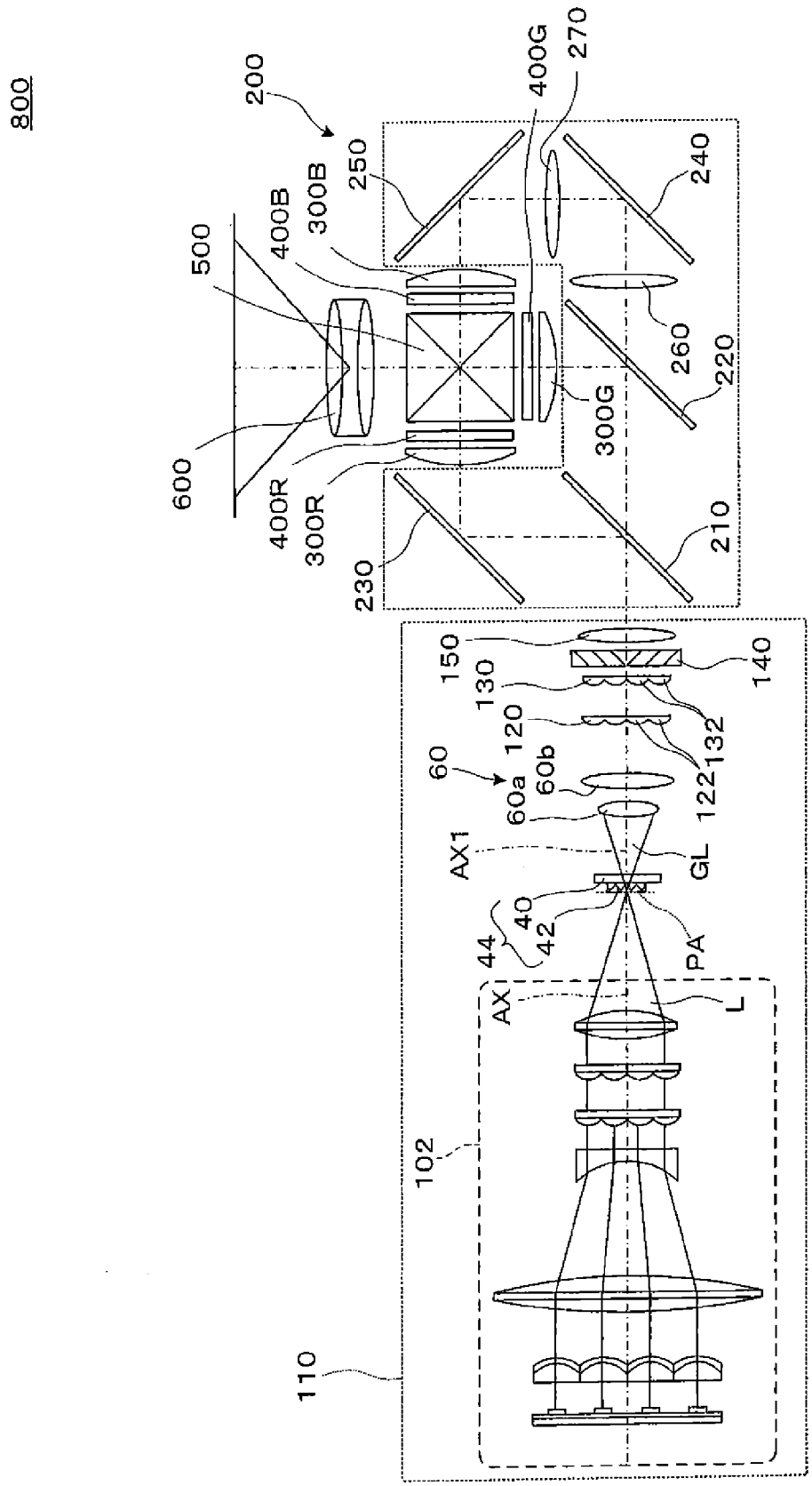
FIG. 9 is a diagram for explaining an example of a projector according to a third embodiment of the invention.

Hereinafter, as a third embodiment, a projector equipped with the light source device according to the embodiment of the invention will be explained. FIG. 9 is a diagram showing the projector 800 equipped with the light source device described above. Although the projector 800 using the light source device 102 shown in FIG. 8 is described here as an example, it is also possible to apply the light source device 100 shown in FIG. 1 instead of the light source device 102.

The projector 800 shown in FIG. 9 is provided with an illumination device 110 including the light source device 102 as a device for generating the illumination light. The illumination device 110 is provided with a light emitting element 44 composed of a plate member 40 and a phosphor layer 42 mounted on the plate member 40, a pickup lens group 60 composed of a pickup lens 60a and a pickup lens 60b, a first lens array 120, a second lens array 130, a polarization conversion element 140, and an overlapping lens 150 besides the light source device 102 described above. Further, the projector 800 is provided with a color separation light guide optical system 200, liquid crystal light modulation devices 400R, 400G, and 400B as a light modulation device, a cross dichroic prism 500, and a projection optical system 600. Further, collecting lenses 300R, 300G, and 300B are disposed between the color separation light guide optical system 200 and the liquid crystal light modulation devices 400R, 400G, and 400B, respectively.

The illumination device 110 generates the illumination light for illuminating the liquid crystal light modulation devices 400R, 400G, and 400B using the source light emitted from the light source device 102.

The phosphor layer 42 is disposed at the irradiation target position PA, and converts, for example, a part of the laser beam L (blue light) as the excitation light emitted from the light source section 11 into light including red light and green light. In other words, the phosphor layer 42 is a wavelength conversion element for converting the laser beam L into the light including components in other wavelength ranges. Specifically, the phosphor layer 42 includes the phosphor (not shown) efficiently excited by the excitation light with the wavelength of 445 nm. The phosphor layer 42 converts a part of the excitation light emitted from the light source device 100 into the yellow fluorescence including the red light and the green light, and then emits the fluorescence. Among the yellow fluorescence, the component on the long wavelength side is used as the red light, and among the yellow fluorescence, the component on the short wavelength side is used as the green light. Further, among the laser beam L, the component not converted by the phosphor layer 42 is used as the blue light. In other words, the light after the conversion has three colors of light components including not only the red light and the green light but also the blue light mixed with each other.

The phosphor layer 42 is formed of a layer including, for example, (Y, Gd)$_3$(Al, Ga)$_5$O$_{12}$:Ce as a YAG phosphor. As the phosphor layer 42, a layer including other phosphors for emitting fluorescence including the red light and the green light can also be used. Further, as the phosphor layer 42, a layer including a mixture of a phosphor for converting the excitation light (the blue light) into the red light and a phosphor for converting the excitation light (the blue light) into the green light can also be used.

It should be noted that the plate member 40 for supporting the phosphor layer 42 is made of a transparent material for transmitting the excitation light, such as quartz glass, quartz crystal, sapphire, optical glass, or transparent resin, and transmits the light passing through the phosphor layer 42. The source light GL is generated by the configuration described above.

The pickup lens group 60 is composed of the pickup lenses 60a, 60b, and roughly collimates the source light GL radially emitted from the phosphor layer 42.

The first lens array 120 has a plurality of first small lenses 122 for dividing the light, which is emitted from the light source device 102 and then passes through the pickup lens group 60, into a plurality of partial light beams. The first lens array 120 has a structure having the plurality of first small lenses 122 arranged in matrix in the plane perpendicular to the illumination light axis AX1 of the illumination device 110, which is an axis on an extension of the optical axis AX of the light source device 102. Although the explanation with a graphical description will be omitted, an outer shape of the first small lens 122 is roughly similar to an outer shape of each of the image forming areas of the respective liquid crystal light modulation devices 400R, 400G, and 400B.

The second lens array 130 has a plurality of second small lenses 132 corresponding to the plurality of first small lenses 122 of the first lens array 120. The second lens array 130 images the image of each of the first small lenses 122 of the first lens array 120 in the vicinity of each of the image forming areas of the liquid crystal light modulation devices 400R, 400G, and 400B in cooperation with the overlapping lens 150. The second lens array 130 has a configuration of arranging the plurality of second small lenses 132 in a matrix in a plane perpendicular to the illumination light axis AX1.

The polarization conversion element 140 is an optical element for converting the light emitted from the second lens array 130 into a substantially unique linearly polarized light having a uniform polarization direction, and then emits the light thus obtained. The polarization conversion element 140 has a polarization split layer for transmitting one linearly polarized component out of the polarization components included in the light from the light source 102 without modification while reflecting the other linearly polarized component in a direction perpendicular to the illumination light axis AX1, a reflecting layer for reflecting the other linearly polarized component, which is reflected by the polarization split layer, in a direction parallel to the illumination light axis AX1, and a wave plate for converting the other linearly polarized component reflected by the reflecting layer into the one linearly polarized component.

The overlapping lens 150 is an optical element for collecting each of the partial light beams from the polarization conversion element 140 to overlap the partial light beams in the vicinity of each of the image forming areas of the liquid crystal light modulation devices 400R, 400G, and 400B. The overlapping lens 150 is disposed so that the optical axis of the overlapping lens 150 and the optical axis of the light source device 102 roughly coincide with each other. The overlapping lens 150 can also be formed of a compound lens having a plurality of lenses combined with each other. The first lens array 120, the second lens array 130, and the overlapping lens 150 constitute an integrator optical system for homogenizing the in-plane light intensity distribution of the light from the light source device 102.

It should be noted that a rod integrator optical system using a rod lens can also be used instead of the lens integrator optical system using the first lens array 120 and the second lens array 130.

The color separation light guide optical system 200 is provided with dichroic mirrors 210, 220, reflecting mirrors 230, 240, and 250, and relay lenses 260, 270. The color separation light guide optical system 200 separates the light from the illumination device 110 into the red light, the green light, and the blue light, and guiding the colored lights of the red light, the green light, and the blue light respectively to the liquid crystal light modulation devices 400R, 400G, and 400B to be the illumination target.

The dichroic mirrors 210, 220 are mirrors each having a wavelength selecting transmissive film formed on a substrate, which reflects the light in a predetermined wavelength band and transmits the light in another wavelength band. The dichroic mirror 210 reflects the red light component, and transmits the green light component and the blue light component. The dichroic mirror 220 reflects the green light component and transmits the blue light component. The reflecting mirror 230 reflects the red light component. The reflecting mirrors 240, 250 reflect the blue light component.

The red light reflected by the dichroic mirror 210 is further reflected by the reflecting mirror 230, and then enters the image forming area of the liquid crystal light modulation device 400R for the red light after passing through the collecting lens 300R. The green light having passed through the dichroic mirror 210 is reflected by the reflecting mirror 240, and then enters the image forming area of the liquid crystal light modulation device 400G for the green light after passing through the collecting lens 300G. The blue light having passed through the dichroic mirror 220 enters the image forming area of the liquid crystal light modulation device 400B for the blue light via the relay lens 260, the reflecting mirror 240 on the entrance side, the relay lens 270, the reflecting mirror 250 on the exit side, and the collecting lens 300B.

The liquid crystal light modulation devices 400R, 400G, and 400B modulate the respective colored lights having input thereto in accordance with the image information to thereby form a color image. Known transmissive liquid crystal light modulation devices can be used as the liquid crystal light modulation devices 400R, 400G, and 400B. The liquid crystal light modulation devices 400R, 400G, and 400B are the illumination target of the illumination device 110. Although omitted from the drawings, an entrance side polarization plate is disposed between each of the collecting lenses 300R, 300G, and 300B and corresponding one of the liquid crystal light modulation devices 400R, 400G, and 400B, and an exit side polarization plate is disposed between each of the liquid crystal light modulation devices 400R, 400G, and 400B and the cross dichroic prism 500. The light modulation of the respective colored lights having entered the entrance side polarization plates is performed by the entrance side polarization plates, the liquid crystal light modulation devices 400R, 400G, and 400B, and the exit side polarization plates described above, respectively.

The cross dichroic prism 500 is a known optical element for combining the optical images modulated for respective colored lights emitted from the respective exit side polarization plates to thereby form a color image.

The color image emitted from the cross dichroic prism 500 is projected in an enlarged manner by the projection optical system 600 to form an image on a screen.

As described above, according to the projector 800 having the configuration described above, the light from the light source section 11 can efficiently be used in the light source device 102 of the illumination device 110. Thus, the high-intensity light can be generated while suppressing the growth in size of the light source. Therefore, the projector 800 is capable of forming a high-intensity and bright image while suppressing the growth in size of the light source.

Modified Example 1

A modified example of the present embodiment will hereinafter be explained. A projector according to the present modified example is different from the projector 800 only in the point that a light emitting element 444 is used instead of the light emitting element in the light source device, and therefore, the explanation of the common configuration will be omitted.

Figure 10A:
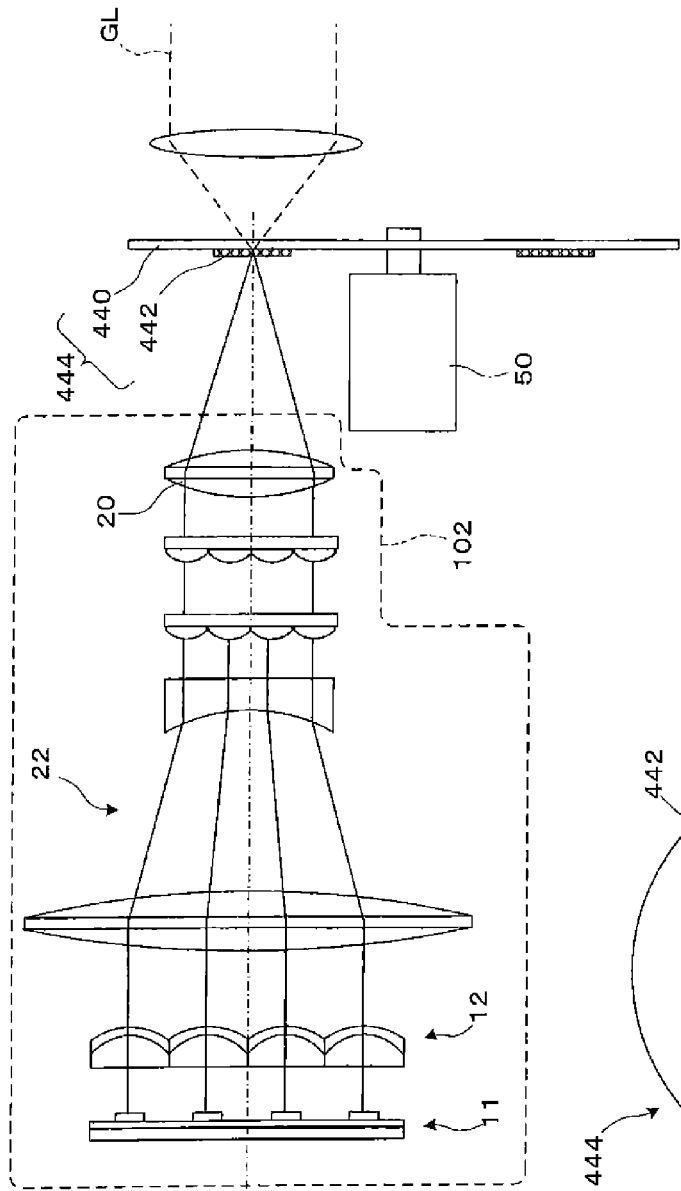
FIG. 10A is a diagram for explaining an optical system of a light source device of a modified example applied to the projector.
Figure 10B:
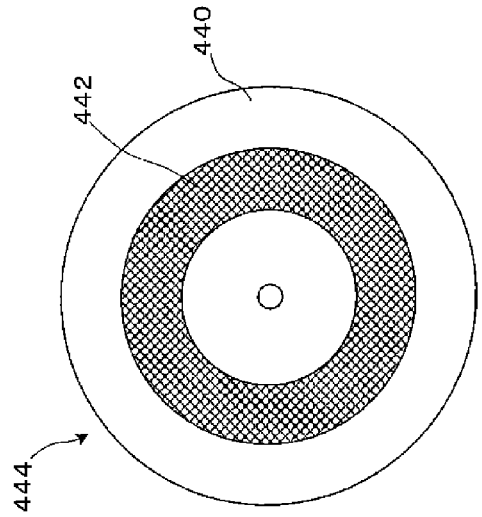
FIG. 10B is a diagram for explaining a rotary fluorescent plate (a light emitting element).

The light emitting element 444 is a rotary fluorescent plate of a transmissive type. As shown in FIGS. 10A and 10B, the light emitting element 444 is formed by disposing a phosphor layer 442 on a plate member 440, which is transparent, has a circular shape, and can be rotated by an electric motor 50. The laser beam L as the excitation light (the blue light) enters the area provided with the phosphor layer 442. The light emitting element 444 emits the source light GL including the red light and the green light toward the opposite side to the side which the laser beam L enters.

The light emitting element 444 rotates around a predetermined rotary axis at 7500 rpm when used. The diameter of the light emitting element 444 is, for example, 50 mm, and is configured so that the optical axis of the excitation light entering the light emitting element 444 is transmitted through the phosphor layer 42 at a place distant about 22.5 mm from the rotational center of the light emitting element 444. In other words, the light emitting element 444 rotates at a rotational speed at which the collected spot of the excitation light moves on the phosphor layer 442 at about 18 m/sec.

In the present modified example, using the rotation mechanism of the light emitting element 444 described above, the heat of the phosphor layer 442 caused by the irradiation with the excitation light radiates in a large area along the rotational direction of the plate member 440, and thus, the degradation of the light emission efficiency due to heating of the phosphor layer 442 can be suppressed.

Also in the present modified example, the distance P1, the distance P2, the distance PX1, and the distance PX2 in the light source device 102 are set in accordance with the cross-sectional shape of the light beam specific to the light source 11a. Thus, the projector according to the present modified example is also capable of forming a high-intensity and bright image while suppressing the growth in size of the light source.

Modified Example 2

Hereinafter, a light source device according to a modified example 2 will be explained. It should be noted that a projector according to the present modified example is different from the projector 800 in the point that a light emitting element 644 is used instead of the light emitting element 44, and the point that a wavelength separation element 90 and a pickup lens 70 are used instead of the collecting lens 20, and therefore, the explanation of the common configuration will be omitted.

Figure 11:
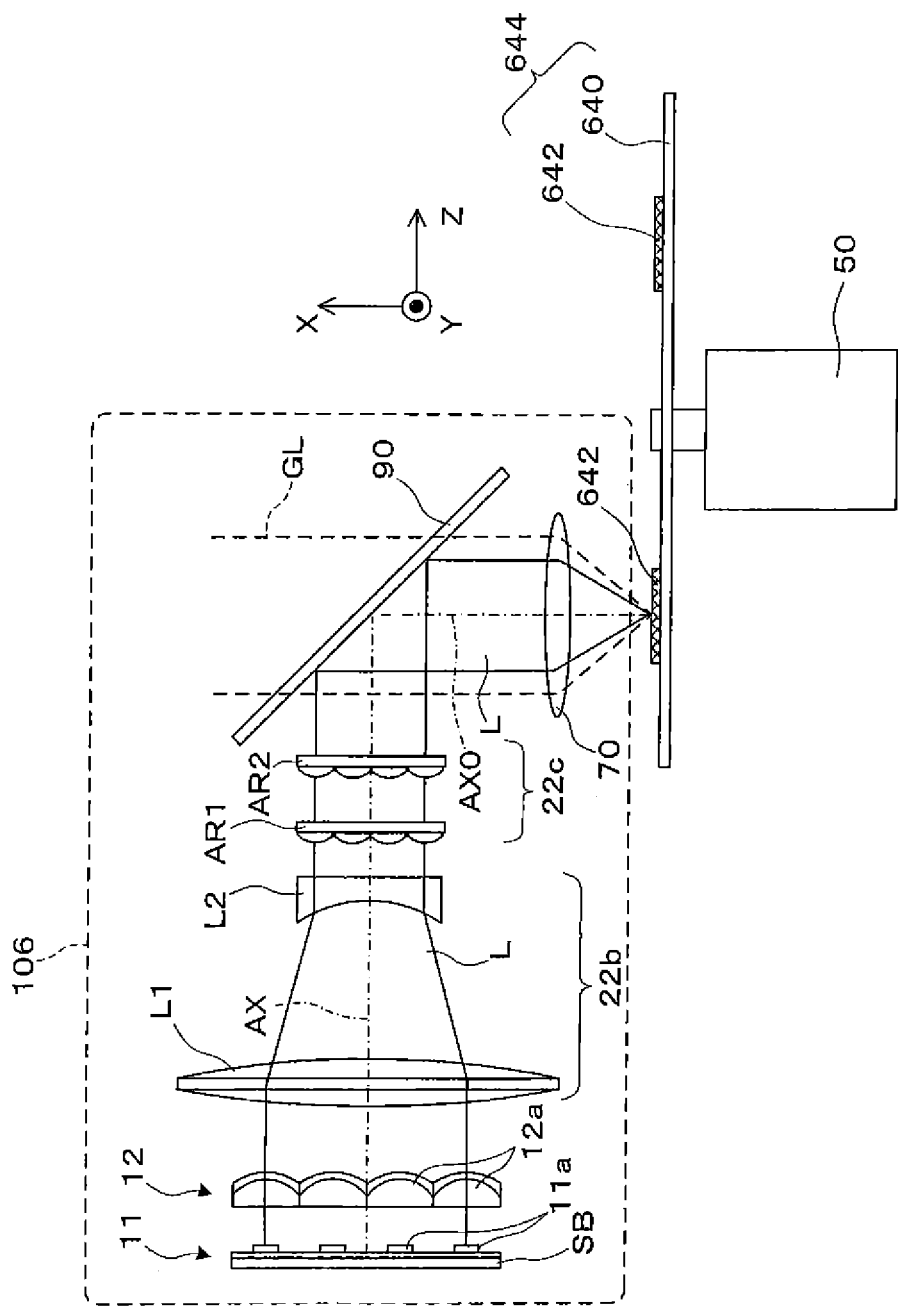
FIG. 11 is a diagram for explaining an optical system of a light source device according to another modified example applied to the projector.

As shown in FIG. 11, a light source device 106 applied to the projector according to the present modified example is provided with the light source section 11, the collimating lens array 12, the afocal optical system 22b, the lens array integrator 22c, the light emitting element 644, the electric motor 50, the pickup lens 70, which is a light collection optical system and at the same time functions as a collimating optical system, and the wavelength separation element 90.

The light emitting element 644 is different from the light emitting element 444 (see FIGS. 10A and 10B) only in the point that a plate member 640 for reflecting fluorescence emitted from a phosphor layer 642 is used instead of the transparent plate member 440, and therefore, the explanation of the common configuration will be omitted.

The material of the plate member 640 for supporting the phosphor layer 642 is not particularly limited providing the plate member 640 has the function of reflecting the fluorescence. The plate member 640 can be made of a transparent material, or can be made of an opaque material such as metal. Further, it is also possible to dispose a dichroic film formed of, for example, a dielectric multilayer film on the opposite side of the phosphor layer 642 to the wavelength separation element 90, and reflect the component, which is a part of the light radiated from the phosphor layer 642, and proceeds toward the plate member 640, toward the wavelength separation element 90 side.

As shown in the drawing, the wavelength separation element 90 is disposed in the light path from the lens array integrator 22c to the light emitting element 644 so as to intersect with both of the optical axis AX of the light source section 11, the collimating lens array 12 and the lens array integrator 22c, and the optical axis AX0 of the light emitting element 644 at an angle of 45°, wherein the optical axis AX and the optical axis AX0 are perpendicular with each other. The wavelength separation element 90 reflects a light component within a range of 430 through 450 nm, which is the wavelength range of the laser beam L. In other words, a most part of the principal component of the laser beam L having passed through the lens array integrator 22c is reflected by the wavelength separation element 90, and then proceeds toward the light emitting element 644.

The pickup lens 70 is disposed in the light path between the light emitting element 644 and the wavelength separation element 90, and makes the laser beam L reflected by the wavelength separation element 90 enter the phosphor layer 642 in a roughly collected state. In other words, the pickup lens 70 converges the laser beam L.

Further, the light emitted from the phosphor layer 642 enters the pickup lens 70, and the pickup lens 70 roughly collimates the light emitted from the phosphor layer 642.

Here, the wavelength separation element 90 reflects the light in the wavelength band of the blue light out of the light emitted from the phosphor layer 642, and at the same time, transmits the component including the green light and the red light. Thus, the source light GL including the green light and the red light is emitted from the light source device 106.

Also in the present modified example, the distance P1, the distance P2, the distance PX1, and the distance PX2 in the light source device 106 are set in accordance with the cross-sectional shape of the light beam specific to the light source 11a. Thus, the projector according to the present modified example is also capable of forming a high-intensity and bright image while suppressing the growth in size of the light source.

Fourth Embodiment

Figure 12:
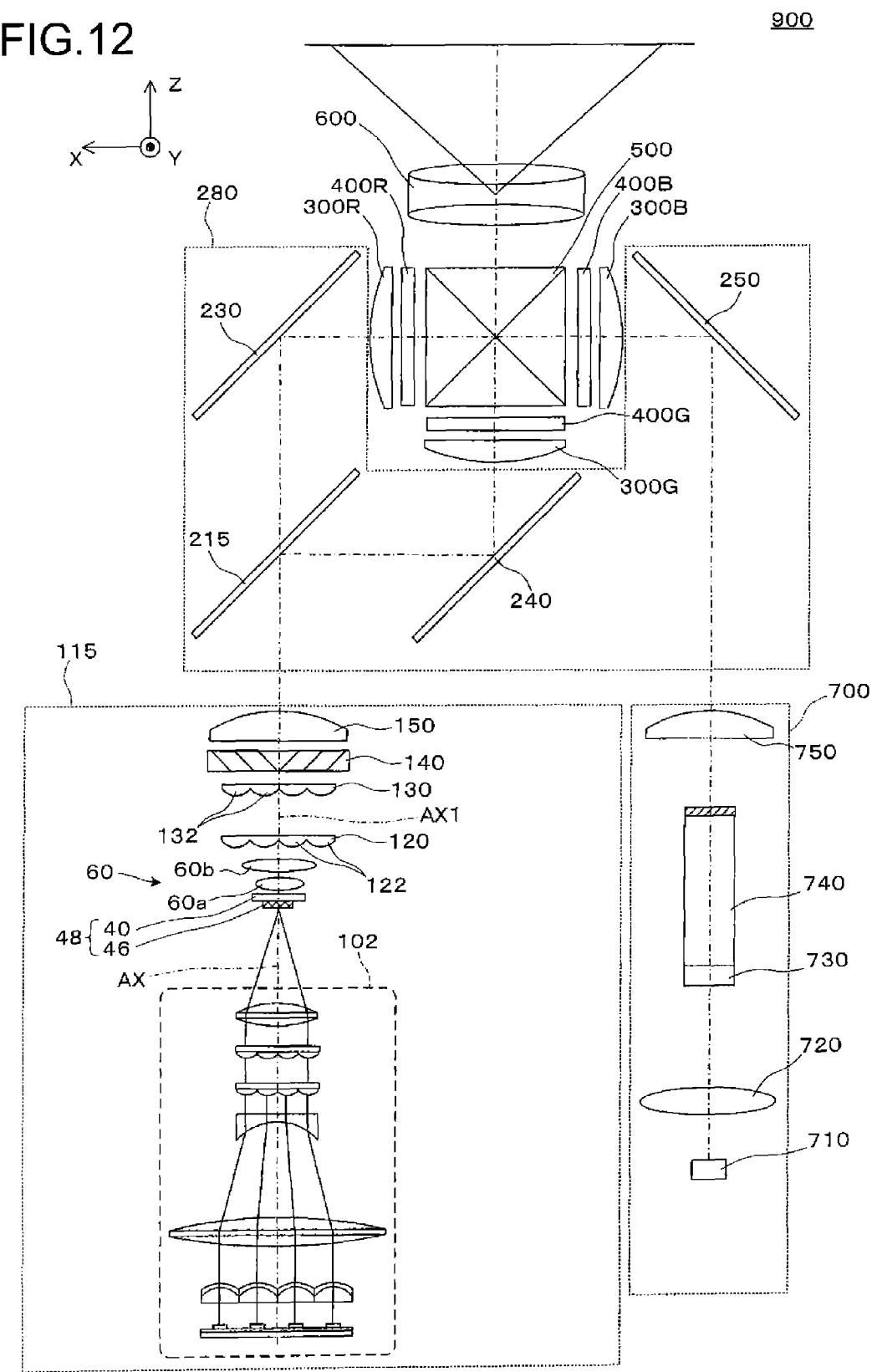
FIG. 12 is a diagram for explaining an example of a projector according to a fourth embodiment of the invention.

Hereinafter, as a fourth embodiment, another projector equipped with the light source device according to the embodiment of the invention will be explained. FIG. 12 is a diagram showing the projector 900 equipped with the light source device described above. Although the projector 900 using the light source device 102 shown in FIG. 8 is described here as an example, it is also possible to apply, for example, the light source device 100 shown in FIG. 1 instead of the light source device 102.

The explanation of the part common to the projector 800 explained as the third embodiment and the projector 900 will be omitted. The projector 900 shown in FIG. 12 is provided with two illumination devices, namely a first illumination device 115 including the light source device 102, and a second illumination device 700.

The first illumination device 115 is different from the illumination device 110 used in the projector 800 explained as the third embodiment only in the configuration of the light emitting element, and therefore, only the light emitting element will be explained with respect to the first illumination device 115. The illumination device 115 is provided with the light emitting element 48. The light emitting element 48 is composed of the plate member 40 and a phosphor layer 46 mounted on the plate member 40. Unlike the phosphor layer 44, the phosphor layer 46 converts whole of the excitation light input thereto into the yellow fluorescence including the red light and the green light, and then emits the fluorescence. Therefore, the first illumination device 115 generates the illumination light for illuminating the liquid crystal light modulation devices 400R, 400G.

The second illumination device 700 is provided with a second light source 710, a light collection optical system 720, a scattering plate 730, a polarization conversion integrator rod 740, and a collecting lens 750, and generates the illumination light for illuminating the liquid crystal light modulation device 400B.

The second light source 710 is a laser source for emitting the blue light (having a peak emission intensity at a wavelength of about 445 nm) consisting of a laser beam. It should be noted that although FIG. 12 shows the single second light source 710, the number of the second light sources 710 is not limited to one, but it is also possible to provide a plurality of second light sources 710. Further, it is also possible to use a light source device for emitting the blue light having a wavelength (e.g., 460 nm) other than 445 nm.

The light collection optical system 720 is formed of, for example, a convex lens, and makes the blue light enter the scattering plate 730 in a roughly converged state.

The scattering plate 730 scatters the blue light from the second light source 710 to thereby obtain the blue light having the light distribution similar to that of the red light and the green light emitted from the light emitting element 48. As the scattering plate 730, obscured glass made of optical glass, for example, can be used.

The polarization conversion integrator rod 740 is an optical element for homogenizing the in-plane light intensity distribution of the blue light from the second light source 710, and converting the blue light into substantially single linearly-polarized light with the polarization directions aligned. Although the detailed explanation is omitted, the polarization conversion integrator rod 740 is provided with an integrator rod, a reflecting plate disposed on the entrance surface side of the integrator rod and having a small hole through which the blue light is input, and a reflective polarization plate disposed on the exit surface side.

It should be noted that a lens integrator optical system using a lens array and a polarization conversion element can also be used instead of the polarization conversion integrator rod using the rod lens.

The collecting lens 750 collects the light from the polarization conversion integrator rod 740, and then makes the light enter the vicinity of the image forming area of the liquid crystal light modulation device 400B.

The projector 900 is further provided with a color separation light guide optical system 280, the liquid crystal light modulation devices 400R, 400G, and 400B as the light modulation device, the cross dichroic prism 500, and the projection optical system 600. Further, the collecting lenses 300R, 300G, and 300B are disposed between the color separation light guide optical system 280 and the liquid crystal light modulation devices 400R, 400G, and 400B, respectively.

The color separation light guide optical system 280 is provided with a dichroic mirror 210, and reflecting mirrors 230, 240, and 250. The color separation light guide optical system 280 separates the light from the first illumination device 115 into the red light and the green light, and guides the colored lights, namely the red light and the green light obtained by the separation, and the blue light from the second illumination device 700 respectively to the liquid crystal light modulation devices 400R, 400G, and 400B to be the illumination target.

The dichroic mirror 215 reflects the green light component while transmitting the red light component. The red light having passed through the dichroic mirror 215 is reflected by the reflecting mirror 230, and then enters the image forming area of the liquid crystal light modulation device 400R for the red light after passing through the collecting lens 300R. The green light reflected by the dichroic mirror 215 is further reflected by the reflecting mirror 240, and then enters the image forming area of the liquid crystal light modulation device 400G for the green light after passing through the collecting lens 300G. The blue light from the second illumination device 700 is reflected by the reflecting mirror 250, and then enters the image forming area of the liquid crystal light modulation device 400B for the blue light after passing through the collecting lens 300B.

As described above, according to the projector 900 having the configuration described above, the light from the light source section 11 can efficiently be used in the light source device 102 of the first illumination device 115. Thus, the high-intensity light can be generated while suppressing the growth in size of the light source. Therefore, the projector 900 is capable of forming a high-intensity and bright image while suppressing the growth in size of the light source.

Other Issues

Although the invention is hereinabove explained along the embodiments, the invention is not limited to the embodiments described above, but can be put into practice in various forms within the scope or the spirit of the invention, and the following modifications, for example, are also possible.

Although in the above description, it is arranged that the phosphor is disposed at the irradiation target position PA to thereby emit the fluorescence converted from the laser beam L, it is also possible to arrange that, for example, a diffusion plate is disposed at the irradiation target position PA to thereby emit the laser beam L in a moderately diffused state.

Although in the embodiments described above, the plurality of light sources 11a is arranged in a matrix as shown in, for example, FIGS. 5A and 53, the invention is not limited to this arrangement. The plurality of light sources 11a can also be arranged in a zigzag alignment.

Although the example of the phosphor radiating the red light and the green light due to the blue excitation light is explained, the phosphor is not limited thereto. For example, it is also possible to use violet light or ultraviolet light as the excitation light, and a phosphor for radiating the three colored lights, namely the red light, the green light, and the blue light, due to the excitation light.

Although the example of the light emitting element having the phosphor layer continuously disposed along the rotational direction of the plate member is explained, the configuration of the light emitting element is not limited thereto. For example, it is also possible to adopt a configuration in which a plurality of types of phosphor layers are disposed along the rotational direction of the plate member, and thus, a plurality of colored lights can sequentially be emitted. The plurality of colored lights sequentially emitted from the light emitting element are modulated by a single light modulation device, and form a color image. Further, the light emitting element is not necessarily required to be rotatable.

Further, although the laser source is used as the light source $11a$ in the above descriptions, the light source $11a$ can also be other solid-state light sources. Further, the light source $11a$ can also be a xenon lamp or a mercury lamp providing the divergence of the light beam has an anisotropic property.

The entire disclosure of Japanese Patent Application No. 2012-253927, filed on Nov. 20, 2012 is expressly incorporated by reference herein.

What is claimed is:

1. A light source device comprising:
a light source section having a plurality of light sources, wherein each of the light sources emits a radial light beam,
a divergence of the radial light beam in a first direction is greater than a divergence of the radial light beam in a second direction perpendicular to the first direction,
the light sources are arranged so as to form a plurality of light source columns parallel to each other and extending in the first direction,
when denoting a pitch of the light sources in the first direction by P1, and a pitch of the light source columns by P2, P1 is larger than P2, and
when denoting a divergence angle of the radial light beam in the first direction by $\theta_\perp$, and a divergence angle of the radial light beam in the second direction by $\theta_\parallel$, the following formula:

$$\tan \theta_\parallel / \tan \theta_\perp \leq P2/P1 < 1.0$$

is fulfilled.

2. The light source device according to claim 1, wherein
the radial light beam has an intensity distribution according to a Gaussian distribution, and
the divergence angles are each an angle at which the intensity of the radial light beam is equal to a value obtained by multiplying $1/e^2$ by an intensity on an optical axis of the radial light beam.

3. The light source device according to claim 1, further comprising:
a collimating lens array including a plurality of lens elements disposed so as to correspond to the plurality of light sources.

4. The light source device according to claim 3, wherein
in the collimating lens array, some of the lens elements constituting a contour portion of the collimating lens array are arranged in accordance with a contour of an irradiation target in a posterior stage, to which the light emitted from the light source section is input.

5. The light source device according to claim 1, wherein each of the light sources is a solid-state light source.

6. The light source device according to claim 5, wherein the solid-state light source is a laser source.

7. The light source device according to claim 1, further comprising:
an afocal optical system adapted to regulate a cross-section of a light beam emitted from the light source section;
a lens array integrator disposed in a posterior stage of the afocal optical system, and adapted to divide light input to the lens array integrator, and emit the light so as to overlap at a predetermined position; and
an object disposed at the predetermined position.

8. The light source device according to claim 7, wherein
the object is one of a diffusion plate adapted to diffuse the light and a phosphor layer adapted to generate a fluorescence.

9. The light source device according to claim 7, further comprising:
a rotary plate adapted to rotatably hold the object.

10. A projector comprising:
the light source device according to claim 1;
a light modulation device adapted to modulate the light from the light source device in accordance with image information; and
a projection optical system adapted to project the modulated light from the light modulation device as a projection image.

11. A projector comprising:
the light source device according to claim 2;
a light modulation device adapted to modulate the light from the light source device in accordance with image information; and
a projection optical system adapted to project the modulated light from the light modulation device as a projection image.

12. A projector comprising:
the light source device according to claim 3;
a light modulation device adapted to modulate the light from the light source device in accordance with image information; and
a projection optical system adapted to project the modulated light from the light modulation device as a projection image.

13. A projector comprising:
the light source device according to claim 4;
a light modulation device adapted to modulate the light from the light source device in accordance with image information; and
a projection optical system adapted to project the modulated light from the light modulation device as a projection image.

14. A projector comprising:
the light source device according to claim 5;
a light modulation device adapted to modulate the light from the light source device in accordance with image information; and
a projection optical system adapted to project the modulated light from the light modulation device as a projection image.

15. A projector comprising:
the light source device according to claim 6;
a light modulation device adapted to modulate the light from the light source device in accordance with image information; and
a projection optical system adapted to project the modulated light from the light modulation device as a projection image.

16. A projector comprising:

the light source device according to claim 7;

a light modulation device adapted to modulate the light from the light source device in accordance with image information; and a projection optical system adapted to project the modulated light from the light modulation device as a projection image.

17. A light source device comprising:

a light source section having a plurality of light sources; and a collimating lens array including a plurality of lens elements disposed so as to correspond to the plurality of light sources, wherein each of the light sources emits a radial light beam, a divergence of the radial light beam in a first direction is greater than a divergence of the radial light beam in a second direction perpendicular to the first direction, the light sources are arranged so as to form a plurality of light source columns parallel to each other and extending in the first direction, when denoting a pitch of the light sources in the first direction by P1, and a pitch of the light source columns by P2, P1 is larger than P2, a first lens element of the plurality of lens elements corresponds to a first light source of the plurality of light sources, and when denoting a distance between the first light source and the first lens element by D, an effective lens width of the first lens element in the first direction by H1, an effective lens width of the first lens element in the second direction by H2, a divergence angle of the radial light beam in the first direction by $\theta_\perp$, and a divergence angle of the radial light beam in the second direction by $\theta_\parallel$, the following relation:

$\tan\theta_\perp \leq H1/(2\times D)$ and $\tan\theta_\parallel \leq H2/(2\times D)$ is fulfilled.

18. The light source device according to claim 17, wherein the radial light beam has an intensity distribution according to a Gaussian distribution, and the divergence angles are each an angle at which the intensity of the radial light beam is equal to a value obtained by multiplying $1/e^2$ by an intensity on an optical axis of the radial light beam.

19. The light source device according to claim 17, wherein in the collimating lens array, some of the lens elements constituting a contour portion of the collimating lens array are arranged in accordance with a contour of an irradiation target in a posterior stage, to which the light emitted from the light source section is input.

20. The light source device according to claim 17, wherein each of the light sources is a solid-state light source.

21. The light source device according to claim 20, wherein the solid-state light source is a laser source.

22. The light source device according to claim 17, further comprising:

an afocal optical system adapted to regulate a cross-section of a light beam emitted from the light source section;

a lens array integrator disposed in a posterior stage of the afocal optical system, and adapted to divide light input to the lens array integrator, and emit the light so as to overlap at a predetermined position; and an object disposed at the predetermined position.

23. The light source device according to claim 22, wherein the object is one of a diffusion plate adapted to diffuse the light and a phosphor layer adapted to generate a fluorescence.

24. The light source device according to claim 22, further comprising:

a rotary plate adapted to rotatably hold the object.

* * * * *